United States Patent [19]
Tingley, III

[11] Patent Number: 5,237,165
[45] Date of Patent: Aug. 17, 1993

[54] MULTI-TURN COIL STRUCTURES AND METHODS OF WINDING SAME

[76] Inventor: Loyal H. Tingley, III, 2537 SE. Pl., Cape Coral, Fla. 33904

[21] Appl. No.: 681,699

[22] Filed: Apr. 5, 1991

[51] Int. Cl.$^5$ ............................................. G06K 19/06
[52] U.S. Cl. .................................... 235/492; 235/451; 336/200; 336/232
[58] Field of Search ............... 235/449, 492, 493, 488, 235/451; 336/200, 232; 343/895, 867, 742

[56] References Cited

U.S. PATENT DOCUMENTS

| | | | |
|---|---|---|---|
| 2,911,605 | 11/1959 | Wales | 336/200 |
| 3,381,264 | 5/1971 | Person | 336/232 |
| 3,484,731 | 12/1969 | Rich, III | 336/200 |
| 4,494,100 | 1/1985 | Stengel et al. | 336/200 |
| 4,506,148 | 3/1985 | Berthold et al. | 235/380 |
| 4,605,844 | 8/1986 | Haggan | 235/380 |
| 4,650,981 | 3/1987 | Foletta | 235/449 |
| 4,692,604 | 9/1987 | Billings | 235/493 |
| 4,795,898 | 1/1989 | Bernstein et al. | 235/492 |
| 4,864,115 | 9/1989 | Imran et al. | 235/492 |
| 4,960,983 | 10/1990 | Inoue | 235/492 |

FOREIGN PATENT DOCUMENTS

| | | | |
|---|---|---|---|
| 62-8281 | 1/1987 | Japan | 235/379 |
| 62-79605 | 4/1987 | Japan | 336/200 |

Primary Examiner—Eugene R. LaRoche
Assistant Examiner—Tan Nguyen
Attorney, Agent, or Firm—Jacobson, Price, Holman & Stern

[57] ABSTRACT

A multi-turn coil structure is wound on a former starting from a central portion of the coil and spirally winding respective lengths of the coil which extend from the central portion around the former in opposite winding directions and in adjacent contiguous planes. This allows outer end portions of the respective windings which constitute input and output leads for the coil each to be accommodated within the bi-planar coil structure. This reduces the overall thickness of the coil compared with conventional structures in which an inner end of the coil structure is extended to the outside in a further contiguous plane adjacent the coil. The structure is particularly suited for miniature wire coils to be used in electronic circuits of security cards.

13 Claims, 4 Drawing Sheets

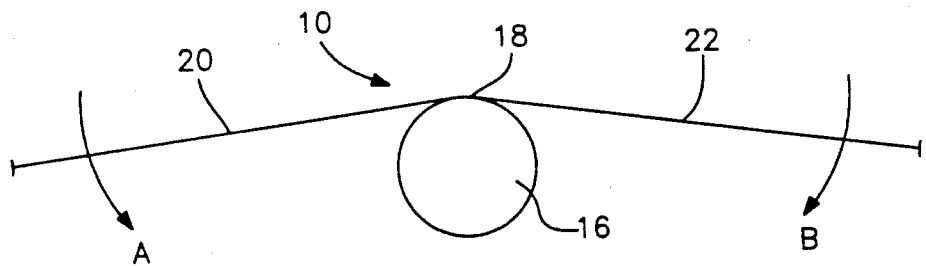
FIG. 1
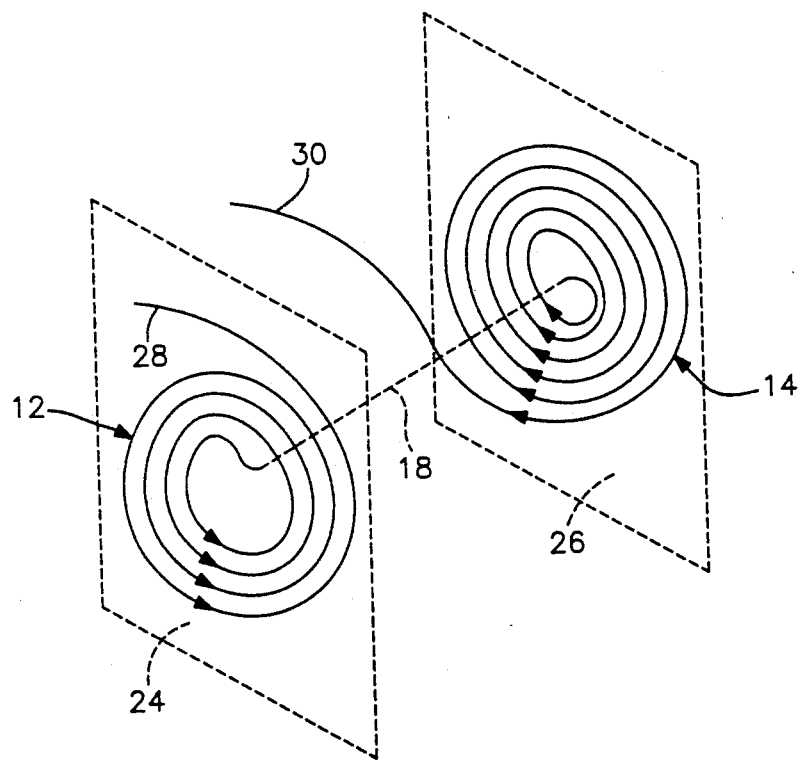
FIG. 2
FIG. 3
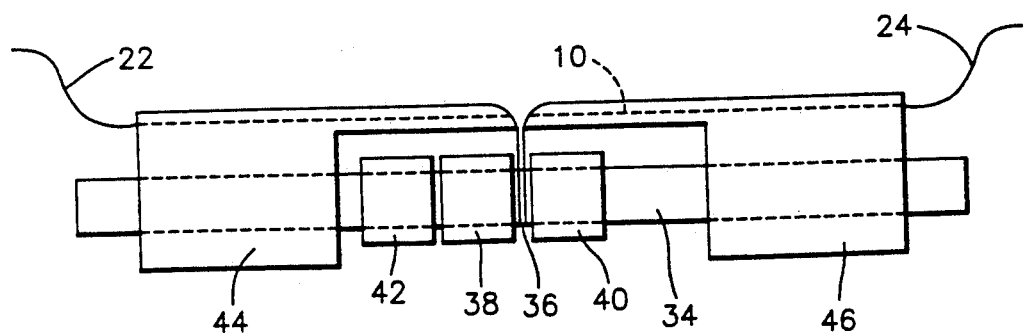

MULTI-TURN COIL STRUCTURES AND METHODS OF WINDING SAME

BACKGROUND OF THE INVENTION

This invention relates to multi-turn coil structures, particularly miniature wire coil structures such as used in electronic circuits of security or "smart" cards, and to methods of winding same.

In a miniature multi-turn wire coil structure made by conventional methods, the coil is wound on a former outwardly from the center of the coil. The outer end of the coil can be extended in the general plane of the coil to form an incoming or outgoing lead. If the inner end of the coil, however, is to be extended to the outside to form an outgoing or incoming lead, it must occupy a plane adjacent the plane of the coil, so that the minimum thickness or width of such a coil is increased by the diameter of the wire.

When it is necessary to accommodate a relatively large number of turns in a limited outer diameter, the coil is wound in two adjacent planes with the winding crossing over between the planes in alternate turns. This results in the coil having a width or thickness of approximately twice the wire diameter. Moreover, the thickness is increased by an additional wire diameter since the inner end of the coil must be brought to the outside in a further adjacent plane.

In certain applications, thickness limitations are critical and it would be advantageous to provide a multi-turn coil including input and output leads which is of reduced thickness compared to known such coils. For example, in portable "smart" electronic cards, such as credit cards or cards used for accessing security systems and the like, there may be a need to accommodate miniature multi-turn wire coils within the thickness of a card layer, and reduction of coil thickness can contribute to an equivalent reduction of the overall card thickness.

Accordingly, the present invention seeks to provide a multi-turn coil structure with input and output leads which is of reduced thickness compared to known such structures.

SUMMARY OF THE INVENTION

In a method of winding a coil structure according to the invention, a length of wire, or other material to be wound, is wound on a suitable former starting from a central point of the wire, and with opposite lengths of the wire extending from said point being wound respectively in opposite senses (clockwise and anticlockwise) on the former into adjacent, preferably contiguous, planar spirals.

Thus, a multi-turn coil structure is produced comprising a pair of planar spiral windings in adjacent, preferably contiguous, planes with a common inner end (or merging inner end portions), the respective windings spiralling outwardly from said inner end in opposite senses respectively and with outer end portions of the respective spiral windings forming input and output leads for the coil within the planes of the respective windings. With this structure, the overall thickness of the coil, including the input and output leads is only two wire diameters, namely the thickness is reduced by one wire diameter compared with coils having an equivalent number of turns and which are wound by the known techniques.

The wire may, for example, be wound using conventional-type winding equipment having a spindle on which the wire is wound between a pair of collars using one or more rotating flyers as will be described in more detail hereinafter. The coil windings may be adhesively bonded t stabilize the spirals and prevent unravelling of the finished coil.

Preferably, the individual turns of the respective spiral windings are wound simultaneously to maintain the in-plane spiral integrity of each winding and prevent cross-over of the individual turns. The invention is of particular application in the production of miniature wire coils for incorporating in the electronic circuitry of an electronic or "smart" card.

Additional features and advantages of the invention will become apparent from the ensuing description of the claims read in conjunction with the attached drawings.

BRIEF DESCRIPTION OF DRAWINGS

FIG. 1 is a diagrammatic side elevational view showing the placement of a wire on a former for winding the wire into a coil structure in accordance with the invention, FIG. 2 is a somewhat diagrammatic perspective view of a coil structure wound according to the invention, FIG. 3 is a diagrammatic front elevational view of one form of winding apparatus for winding the coil.

DESCRIPTION OF PREFERRED EMBODIMENTS

Figure 4A:
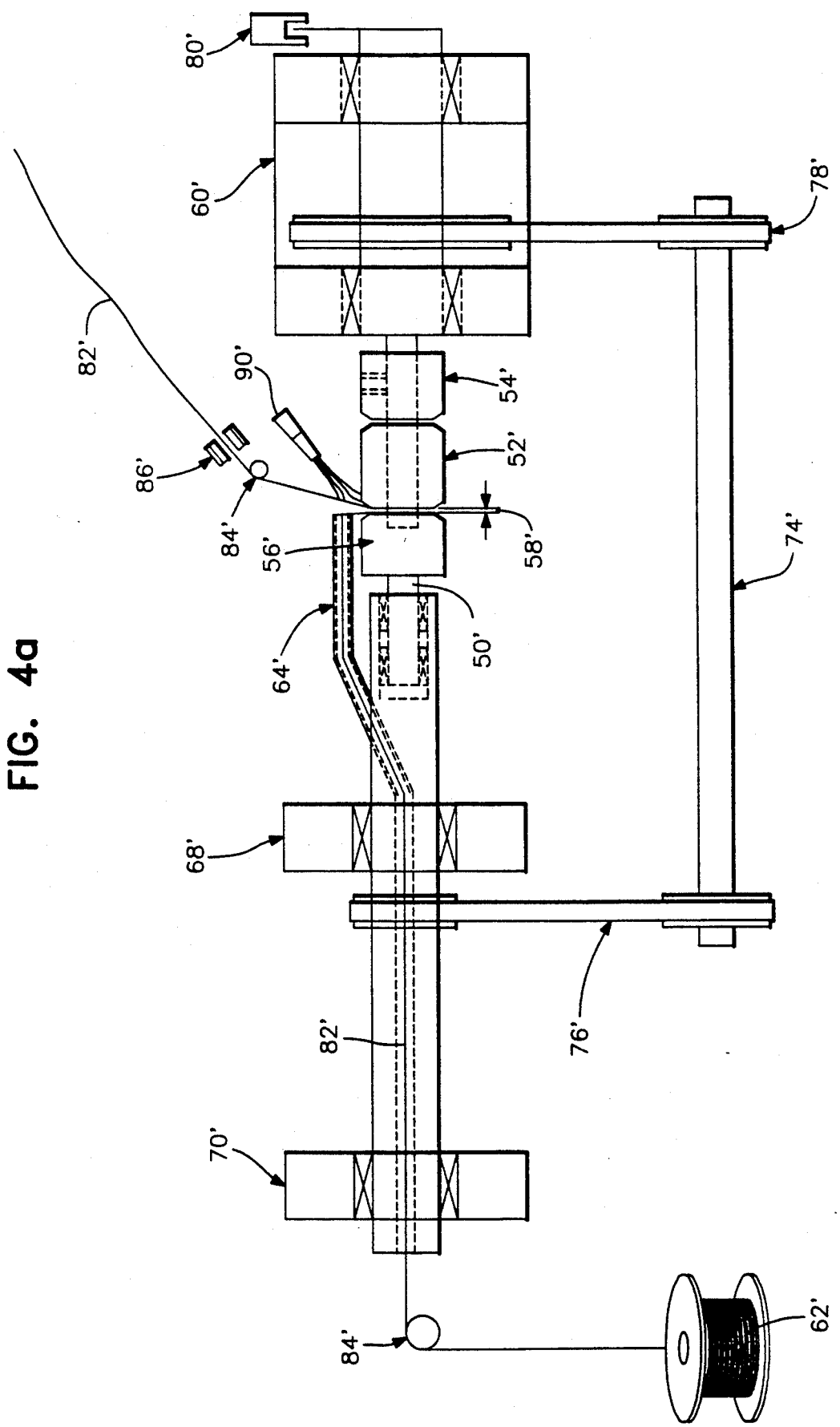
FIG. 4a is a view similar to FIG. 4 of a modified winding apparatus.

Referring to FIGS. 1 and 2, a length of wire 10 (FIG. 1) to be wound into a coil having two adjacent planar spirals 12, 14 (FIG. 2) is positioned on a former 16 so that a central point 18 of the wire engages the periphery of the former, and so that lengths 20 and 22 of the wire extending from the central point are on opposite sides of the former. Then, length 20 is wound in an anticlockwise planar spiral 12 on the former (arrow A) while length 22 is wound in a clockwise planar spiral 14 on the former (arrow B) in a plane which is contiguous to the plane in which length 20 is wound.

The resultant coil, as shown in FIG. 2, which may, for example, be a miniature wire coil for use in an electronic circuit of a so called "smart" card, has the spiral windings 12 and 14 oppositely wound in contiguous planes 24, 26 with central point 18 of wire 10 forming a common inner end of each spiral and with outer ends 28, 30 forming input and output leads for the coil being disposed within the planes of the respective spiral windings. (It will be understood that to aid illustration, planes 24 and 26 are shown separated in FIG. 2 and point 18 is shown as a dotted line. In practice, however, planes 24 and 26 are preferably contiguous and the inner end portions of the respective spirals merge together at point 18.) It is also evident that the overall thickness of the coil structure shown in FIG. 2 is only two times the diameter of the wire 10.

In a practical embodiment of the invention, it is necessary to fit a coil structure as described above, and which is wound from 0.003 inch diameter wire into a space, for example in an electronic card, having a width of 0.008 inch. With conventional winding techniques, if the coil is to have input and output leads, 36 turns, and fit in an outer diameter of about 0.4 inch, the width of the completed coil would be 0.009 inch (i.e. three times the wire diameter) due to the central end having to be brought to the outside in a plane adjacent the bi-planar coil structure. With the present invention, however, the overall thickness is reduced to 0.006 inch (two times the wire diameter) for the same length of coil since the input and output leads are both contained within the bi-planar coil structure.

Preferably, a coil as shown in FIG. 2 will be wound on a spindle (the former) in a space corresponding to the overall coil thickness between a pair of collars on the spindle. In winding the coil, in order to ensure that the individual windings of each spiral are maintained in plane, and that the windings do not tend to cross over from the plane of one spiral to the other, it is preferred that the individual turns of the two spirals be wound simultaneously.

FIG. 3 shows one form of winding apparatus suitable for winding a coil as described above in relation to FIGS. 1 and 2. In this arrangement, the respective spirals are wound on a spindle 34 in a space 36 defined between a pushoff collar 38 and tailstock collar 40. The width of the space 36 corresponds to twice the diameter of the wire to be wound (0.006 inch in the example quoted above). The spindle is also provided with a length adjust collar 42 for adjusting the width of gap 36 to suit different diameter wires.

The central portion of wire 10 is wound around the spindle 34 in the gap 36 and the portions 22 and 24 of the wire extending from the central portion are led through opposing rotary flyers 44, 46. The portions 22 and 24 of the wire will generally be of equal length. The flyers are rotated in opposite directions in order to form the respective wire spirals 12 and 14 on the spindle.

The apparatus shown in FIG. 3 requires the control of two loose rotating wire ends. As an alternative therefore, apparatus as shown in FIG. 4 may be used.

In this arrangement a spindle 50 is again provided with an ejector collar 52, a length adjust collar 54 and a barrier 56 with a gap 58 in which the coil is to be wound being formed between the barrier and the ejector collars. On the right hand side, the spindle is provided with a ball slide 60. To the left of collar 54, a wire supply bobbin 62 is carried on the spindle and to the left of the bobbin is a flyer 64 carried by a sleeve 66 for rotation around the spindle. The sleeve is carried in mounting brackets 68, 70. A drive is provided for rotating both the spindle and the flyer in the same direction with the flyer rotating at twice the rotational speed of the spindle. The drive comprises a DC motor 72 having an output shaft 74, a first timing belt and pulley drive 76 for the spindle and a second timing belt and pulley drive 78 for the flyer. Additionally the apparatus includes a counter mechanism 80 for counting the number of revolutions of the spindle and terminating the drive when a desired number of revolutions is counted.

In use, with the barrier 56 retracted a full bobbin is placed on the spindle in the position shown and the barrier is closed. Wire 82 from the bobbin is fed through the flyer toward the gap 58. A length of wire is pulled out of the flyer, wound around the spindle in gap 58, then over a guide rod 84 and through the felts of a felt tension clip 86. The length of wire 82' fed through the clip should be sufficient to form the right hand winding of the coil.

After feeding of the wire as above, the motor 72 is set in motion to rotate the flyer and spindle in the same directions with the flyer rotating at twice the spindle speed. This motion is effective to wind the wire in gap 58 into a coil as previously described.

The wire may be coated with a self bonding adhesive insulation which may be activated during winding of the coil for example by a suitable solvent supplied through a spray device 90. The solvent may, for example comprise methyl ethyl butane, acetone or alcohol depending the wire coating. For use in a miniature coil for an electronic smart card, the wire may be a copper magnet wire or other standard bondable wire coated with a suitable insulation coating such as polyurethane with Nylon, and an adhesive top coat such as polyvinyl butyrol, which can be heat or solvent bonded. The solvent may be sprayed on as described above or applied with felt pads.

When the required number of turns of wire having been wound, for example 18 turns in each spiral, the counter 80 stops the motor whereafter the wire is clipped, (the input and output leads,) the barrier is opened, and the completed coil is removed.

Figure 4:
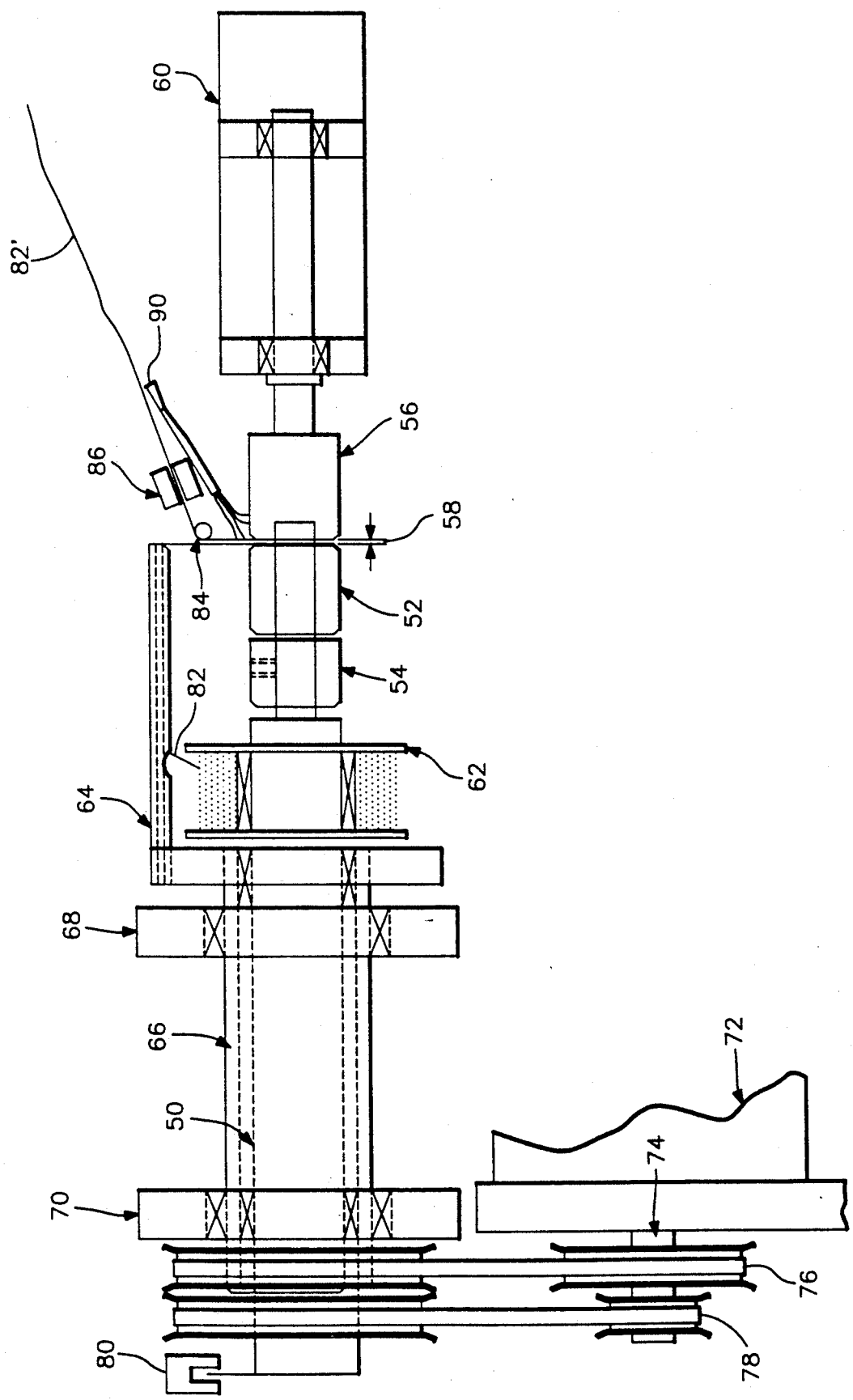
FIG. 4 is a view similar to FIG. 3 showing another form of winding apparatus for the coil.

FIG. 4a shows an arrangement similar to FIG. 4 (like references being used to denote like parts) in which the wire is supplied from a reel 62' rather than a bobbin mounted on the spindle. In this case, the wire 82 is threaded through the spindle 50' to flyer 64' and thence over the spindle, around the guide rod 84' and then to the felt clip 86' as previously. The 2:1 ratio drive systems 76', 78' for the flyer and spindle are split as between the left and right hand sides of the apparatus and the drive motor is not shown in this figure. Working of the apparatus is otherwise similar to that of FIG. 4.

Figure 5:
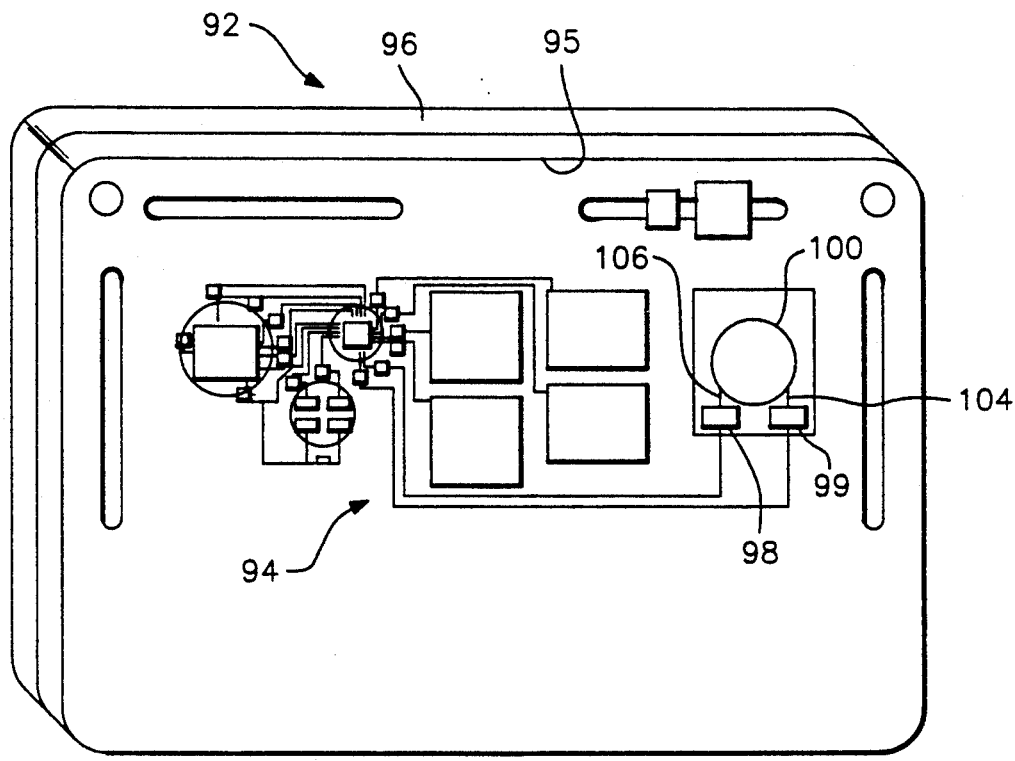
FIG. 5 is a perspective view from one side of a core element for an electronic "smart" card which includes a printed circuit and which is shown to an exaggerated thickness.
Figure 6:
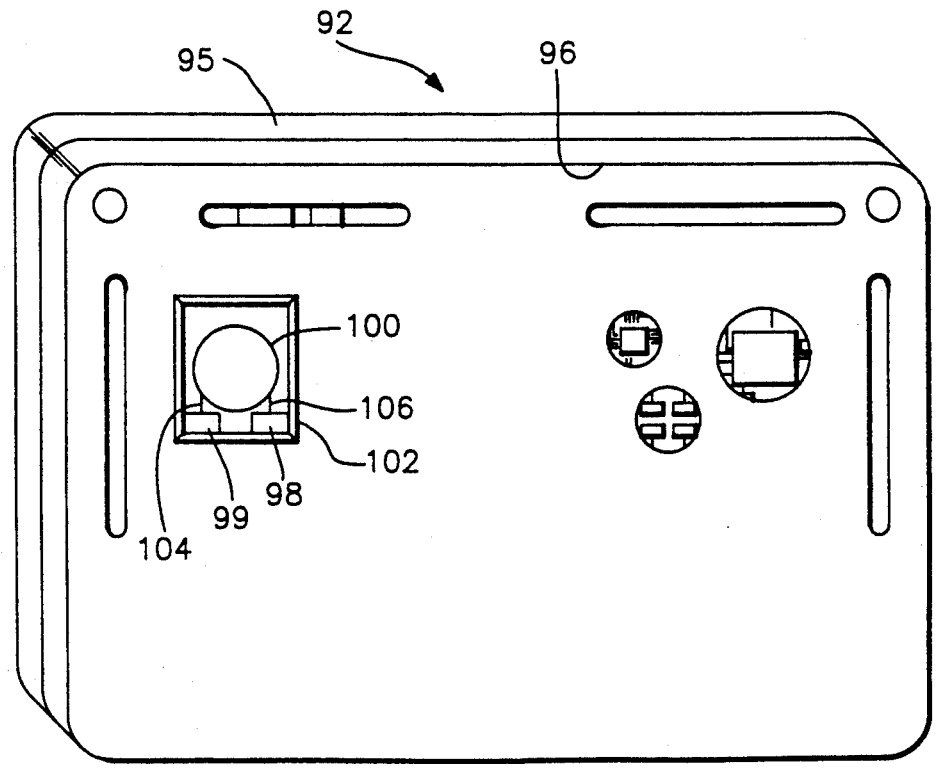
FIG. 6 is a similar perspective view from the other side of the core element.

FIGS. 5 and 6 shows the manner in which a miniature biplanar coil structure manufactured in accordance with the invention as described above, may be used in an electronic circuit embedded in a smart card for activating an electronic system in combination with a card reader or the like. Thus, FIGS. 5 and shows a core element 92 for such card, the core element comprising laminated sheet layers 95 and 96 of plastic sheet. Layer 95 may be transparent and is provided with a printed circuit (the elements of the printed circuit form no part of the present invention) having, inter alia a pair of connectors 98, 99 for the coil 100. Layer 96 may be translucent and may be formed, inter alia with a cut-out or well 102 for receiving the coil. The in-plane inlet and outlet leads 104, 106 of the coil may be soldered to the connectors 98, 99. The sheet 94 may have a thickness of 0.008 inch (the thickness referred to above) and the coil may, as previously described be formed from wire of 0.003 inch diameter. Thus, it is advantageous that the overall core thickness is only 0.006 inch as previously described. In the completed smart card, the edges of the core element 92 are trimmed to size and the core element is laminated between front and back plastic sheets (not shown). Other uses for coils according to the invention may be seen, for example, in U.S. Pat. Nos. 4,692,604; 4,605,844 and 4,864,115.

While only preferred embodiments of the invention have been described herein in detail the invention is not limited thereby and modifications can be made within the scope of the attached claims.

I claim:

1. A multi-turn coil structure comprising a single length of wire wound into a pair of planar spiral windings located in adjacent planes, the windings having inner end portions merging together at a point on the wire and spiralling outwardly from the inner end portions in opposite senses respectively, the windings further having outer end portions forming input and output lead elements for the coil, said outer end portions being located in the planes of the respective windings.

2. A structure as defined in claim 1 wherein said planes are contiguous.

3. A structure as defined in claim 1 wherein the windings ar adhesively bonded to maintain the integrity of coil.

4. A structure as defined in claim 1 wherein the coil is coated with an insulating material activated to adhesively bond the windings and maintain the integrity of the coil.

5. A structure as defined in claim 1 wherein the coil is a miniature coil for use in an electronic circuit of a smart card.

6. In an electronic smart card having a core element of laminated plastic sheets and front and back plastic sheets laminated to opposite surfaces of the core element, one of said plastic sheets of the core element provided with a printed circuit and the other of said plastic sheets of the core element defining a cut-out receiving a miniature wire coil having input and output leads connected to terminals of the printed circuit, the improvement wherein said coil comprises a single length of wire wound into adjacent planar spiral windings in contiguous planes with inner end portions merging together at a point on the wire and spiralling outwardly from the inner end portions in opposite senses respectively, the windings having outer end portions defining the respective input and output leads being located in plane with the respective windings, the coil having an overall thickness of substantially two times the wire diameter.

7. The improvement of claim 6 wherein the windings are adhesively bonded to maintain the integrity of coil.

8. The improvement of claim 6 wherein the input and output leads are soldered to the respective terminals.

9. An element of sheet material having an electronic circuit printed thereon, the circuit including a pair of connectors and the element including a miniature wire coil substantially flat on the sheet with input and output leads electrically connected to said connectors, the coil comprising a single length of wire wound into contiguous planar oppositely wound spiral windings with inner end portions merging together at a point on the wire and outer end portions defining the input and output leads extending from the planes of the respective windings.

10. An element as defined in claim 9 having a further sheet laminated thereto with a cut-out receiving the coil.

11. An element as defined in claim 10 which comprises a core element for an electronic smart card.

12. A portable smart card having an electronic circuit embedded therein including a miniature wire coil comprising a single wire wound into a pair of contiguous oppositely wound planar spiral windings with inner end portions merging together at a point on the wire and outer end portions defining input and output leads extending from the planes of the respective windings and electrically connected to respective connectors of the circuit.

13. A card as defined in claim 12 wherein the circuit is printed on one layer of a laminated core element of the card which includes another layer having a cut-out receiving the coil.

* * * * *